(12) United States Patent
Matsubara et al.

(10) Patent No.: US 7,655,338 B2
(45) Date of Patent: Feb. 2, 2010

(54) FUEL CELL

(75) Inventors: Junichi Matsubara, Seto (JP); Tsutomu Kohara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 87 days.

(21) Appl. No.: 12/084,554

(22) PCT Filed: Jan. 24, 2007

(86) PCT No.: PCT/JP2007/051534

§ 371 (c)(1),
(2), (4) Date: May 5, 2008

(87) PCT Pub. No.: WO2007/088865

PCT Pub. Date: Aug. 9, 2007

(65) Prior Publication Data

US 2009/0253018 A1 Oct. 8, 2009

(30) Foreign Application Priority Data

Jan. 31, 2006 (JP) ............................ 2006-023575

(51) Int. Cl.
*H01M 2/00* (2006.01)
(52) U.S. Cl. ............................ 429/34; 49/62
(58) Field of Classification Search ............. 429/34, 429/35; 49/62
See application file for complete search history.

(56) References Cited

U.S. PATENT DOCUMENTS

2002/0187376 A1* 12/2002 Nishiumi ................. 429/23

FOREIGN PATENT DOCUMENTS

| JP | 61-38772 | 3/1986 |
|---|---|---|
| JP | 10-255829 A | 9/1998 |
| JP | 2002-367666 A | 12/2002 |
| JP | 2007-87678 A | 4/2007 |

* cited by examiner

*Primary Examiner*—Jerry Lorengo
*Assistant Examiner*—Jared Wood
(74) *Attorney, Agent, or Firm*—Kenyon & Kenyon LLP

(57) ABSTRACT

An output cable for transferring an output of a fuel cell stack to a device provided outside a stack case and an output terminal portion of the fuel cell stack are connected to each other, and a blocking device capable of blocking the fuel cell stack from supplying the output thereof to the device through mechanical operation from outside the stack case is provided. In the stack case, a first through hole for allowing for maintenance and checkout from the outside of the stack case to the inside is formed, and the blocking device is attached so as to cover this first through hole from outside. The blocking device includes a housing made of a solid body, a second through hole for communicating the outside of the stack case with the inside by communicating with the first through hole, and a closing cover for closing the second through hole.

6 Claims, 5 Drawing Sheets

FUEL CELL

This is a 371 national phase application of PCT/JP2007/051534 filed 24 Jan. 2007, which claims priority of Japanese Patent Application No. 2006-023575 filed 31 Jan. 2006, the contents of which are incorporated herein by reference.

BACKGROUND

The present invention relates to a fuel cell including a hole for maintenance and checkout in a stack case and a blocking device capable of blocking a fuel cell stack from supplying an output to an external device through mechanical operation from outside the stack case.

In recent years, a fuel cell electric vehicle etc. is attracting attention, in which a fuel cell for generating electric power through electrochemical reaction of a fuel gas and an oxidizing gas is used as an energy source. This fuel cell, generally, includes a fuel cell stack having a cell laminate in which a required number of cells for generating electric power through electrochemical reaction of a fuel gas and an oxidizing gas are stacked one on top of the other, and it is formed by covering the outside of this fuel cell stack with a stack case.

Then, as for this fuel cell, there is known a fuel cell including a so-called "service plug" that functions as an electric current breaker for isolating electrically an output cable from the fuel cell stack at the time of maintenance and checkout of the fuel cell stack (for example, see Japanese Patent Laid-Open No. 2002-367666).

SUMMARY

Now, such a fuel cell has a service plug provided in a stack case thereof, and further a hole for maintenance and checkout (so-called "service hole") formed in the stack case, but, because the stack case is made of a thin metal sheet and it is difficult to realize flatness on an opening portion of the hole for maintenance and checkout, sufficient sealing may not be provided, when a cover for covering this hole is attached.

Further, because the stack case is formed by pressing, a man-hour for after-working on the hole for maintenance and checkout is increased, adding to the cost.

The present invention, in view of circumstances described above, was made and aims to provide a fuel cell in which a hole for maintenance and checkout can be formed with sufficient sealing being secured without an increased cost.

Therefore, in order to achieve the aim described above, the fuel cell of the present invention is a fuel cell including: a fuel cell stack; a stack case for containing the fuel cell stack; a junction portion for electrically interconnecting an output cable for transferring an output of the fuel cell stack to a device provided outside the stack case, with an output terminal portion of the fuel cell stack; and a blocking device capable of interrupting interconnection of the junction portion through mechanical operation from outside the stack case, in which, in the stack case, a first through hole for allowing for maintenance and checkout from the outside of the stack case to the inside is formed, to the stack case, the blocking device is attached so as to cover the first through hole from outside, and the blocking device includes: a housing formed of a solid body; a second through hole for communicating the outside of the stack case with the inside by communicating with the first through hole; and a closing cover for closing the second through hole.

Owing to such configuration, a hole for maintenance and checkout (so-called "service hole") for allowing for access from the outside of the stack case to the inside can be configured with the first through hole formed in the stack case and the second through hole formed in the blocking device, and the second through hole formed in the housing made of a solid body, of the blocking device is closed by the closing cover.

Accordingly, it is enabled to enhance the flatness on an edge of an opening of the hole for maintenance and checkout composed of the first through hole and the second through hole, and to stably contact the closing cover for closing the hole for maintenance and checkout with the edge of the opening of this hole, providing sufficient sealing on this hole. Further, an increase in cost by having to accurately form the hole for maintenance and checkout by after-working on the stack case can be kept down.

The housing of the blocking device may be made of a solid body formed, for example, by machining aluminum in form of frame. Further, rigidity required to secure sealing may be structurally actualized by forming a rib etc. on a wall surface of the housing.

Owing to the fuel cell of the present invention, the hole for maintenance and checkout can be provided with sufficient sealing being secured without an increased cost.

BEST MODE FOR CARRYING OUT THE INVENTION

Now, a first embodiment of the fuel cell according to the present invention will be described with reference to FIGS. 1 and 2.

Figure 1:
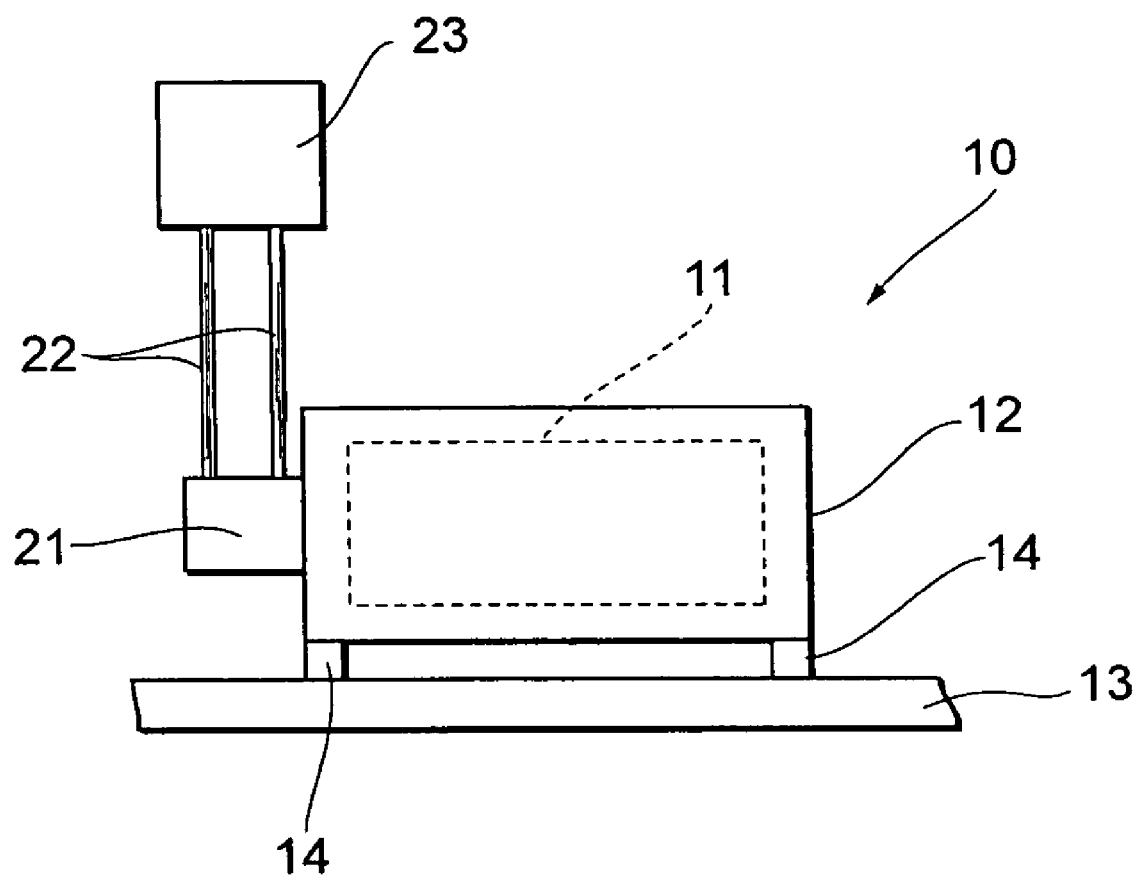
FIG. 1 is a view for schematically illustrating a configuration of a fuel cell.

FIG. 1 shows a fuel cell 10. This fuel cell 10 can be applied to an in-vehicle electric generating system for a fuel cell electric vehicle, an electric generating system for all movable bodies such as a ship, an airplane, an electric train or a walking robot, and further a stationary electric generating system used as a power generating unit for architecture (a housing unit, a building), and specifically it is applied to a vehicle.

As shown in FIG. 1, the fuel cell 10 includes a fuel cell stack 11 having a cell laminate in which a required number of cells for generating electric power through electrochemical reaction of a fuel gas and an oxidizing gas are stacked one on top of the other, and a stack case 12 for covering the outside of this fuel cell stack 11, made of, for example, aluminum.

Then, this fuel cell 10 is supported by a frame 14 made of, for example, aluminum on a car body 13 made of an iron sheet etc. Further, on an outer surface of the stack case 12 of the fuel cell 10, a blocking device 21 is provided, and an output cable 22 connected to this blocking device 21 is connected to a power control unit 23 provided outside the stack case 12.

In addition, this power control unit 23 includes: an inverter for supplying power to a drive motor of a vehicle; an inverter for supplying power to various auxiliary machines, such as a compressor motor or a motor for a hydrogen pump, necessary to operate the fuel cell 10; and a DC-to-DC converter for charging storage means such as a secondary battery or supplying power from the storage means to motors, but illustration of those is omitted.

Figure 2:
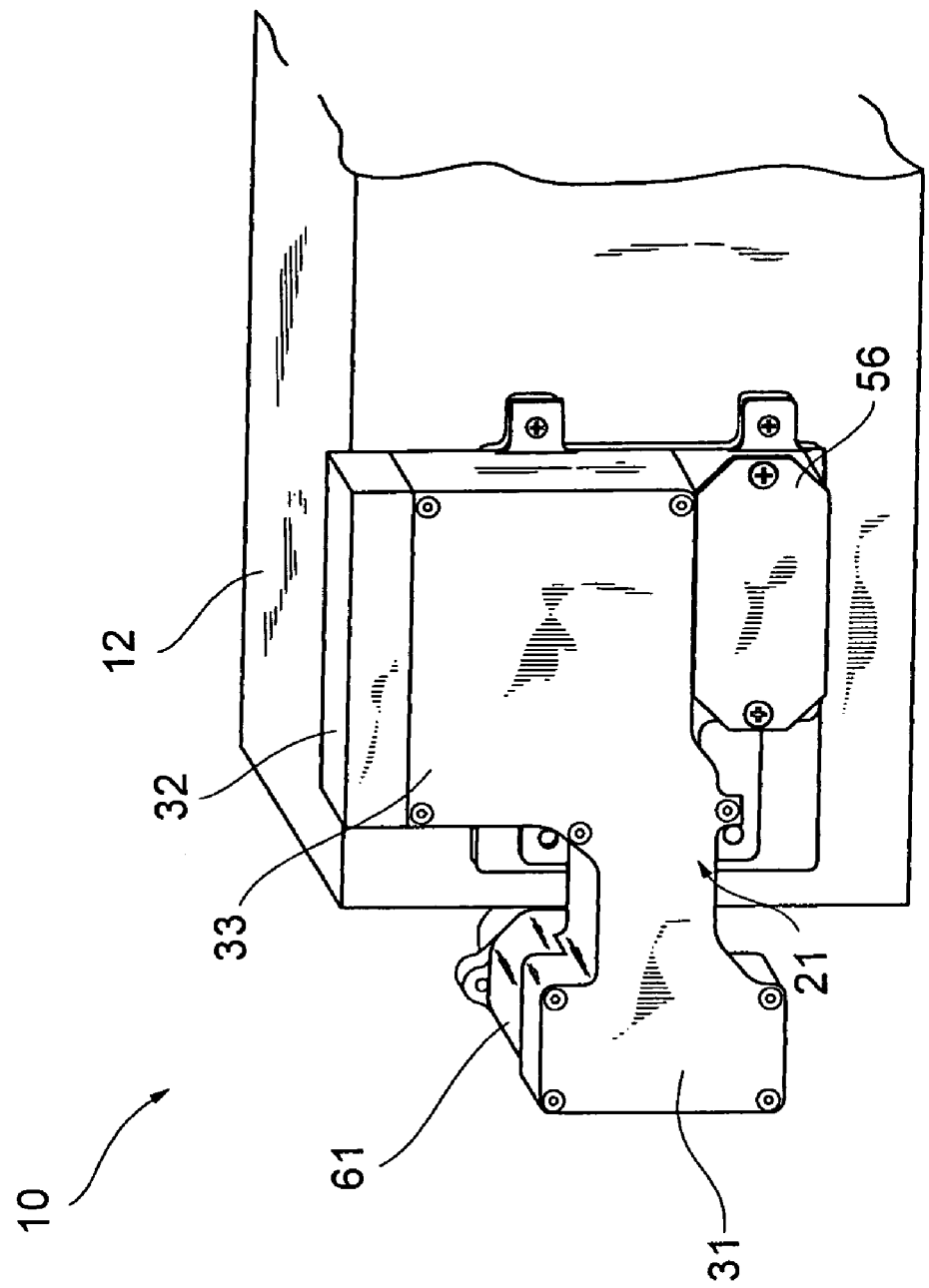
FIG. 2 is a perspective view of the fuel cell for illustrating a blocking device.
Figure 3:
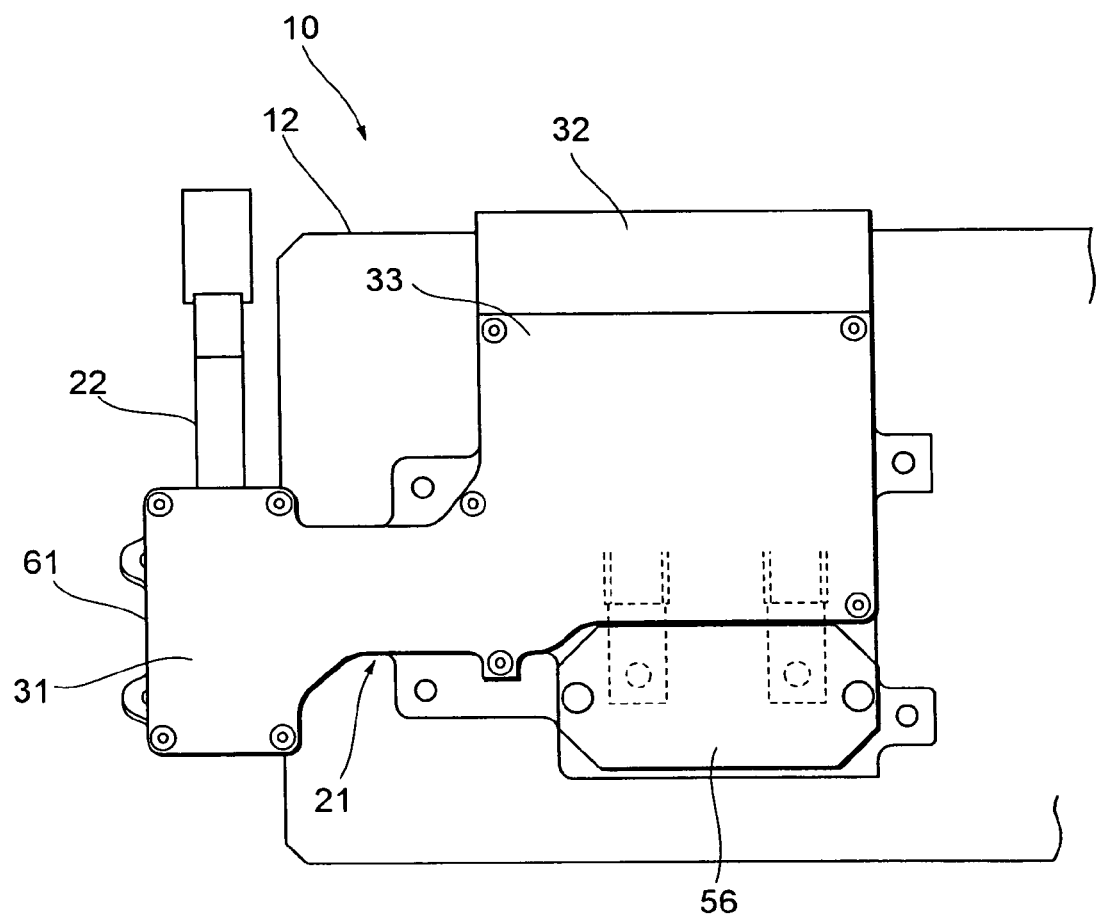
FIG. 3 is an elevation view of the fuel cell for illustrating the blocking device.

As shown in FIGS. 2 and 3, an upper portion of the blocking device 21 is formed as a plug connect portion 33, and to/from this plug connect portion 33, a service plug 32 is connected/disconnected by mechanical operation from outside the stack case 12.

A housing of this blocking device 21 is made of a solid body formed by machining aluminum in form of frame, and on an obverse surface thereof, a cover 31 is fixed with screws. The term "solid body" used here means a body which has strength enough to secure a value of flatness on an edge of an opening in a second through hole 55 described below, of not smaller than a predetermined value, when the hole is formed.

Further, this predetermined value is defined as strength at which the flatness on a service hole against a stress (in this embodiment, the flatness on the edge of the opening of the second through hole 55) becomes higher than the flatness on an edge of an opening of the stack case alone, when the housing of the blocking device 21 is attached to the edge of the opening of the stack case alone (in this embodiment, a first through hole 42).

In the housing of the blocking device 21, it is preferable that the strength in a portion for reinforcing the service hole is higher than the strength in the edge of the opening of the stack case alone.

The configuration described above can be implemented by making a plate thickness of a housing of the service plug 32 (complex of a seating and a terminal cover) thicker than a plate thickness of the stack case 12, or enlarging geometrical moment of inertia of the housing of the service plug 32 more than geometrical moment of inertia of the opening portion of the stack case 12.

Figure 4:
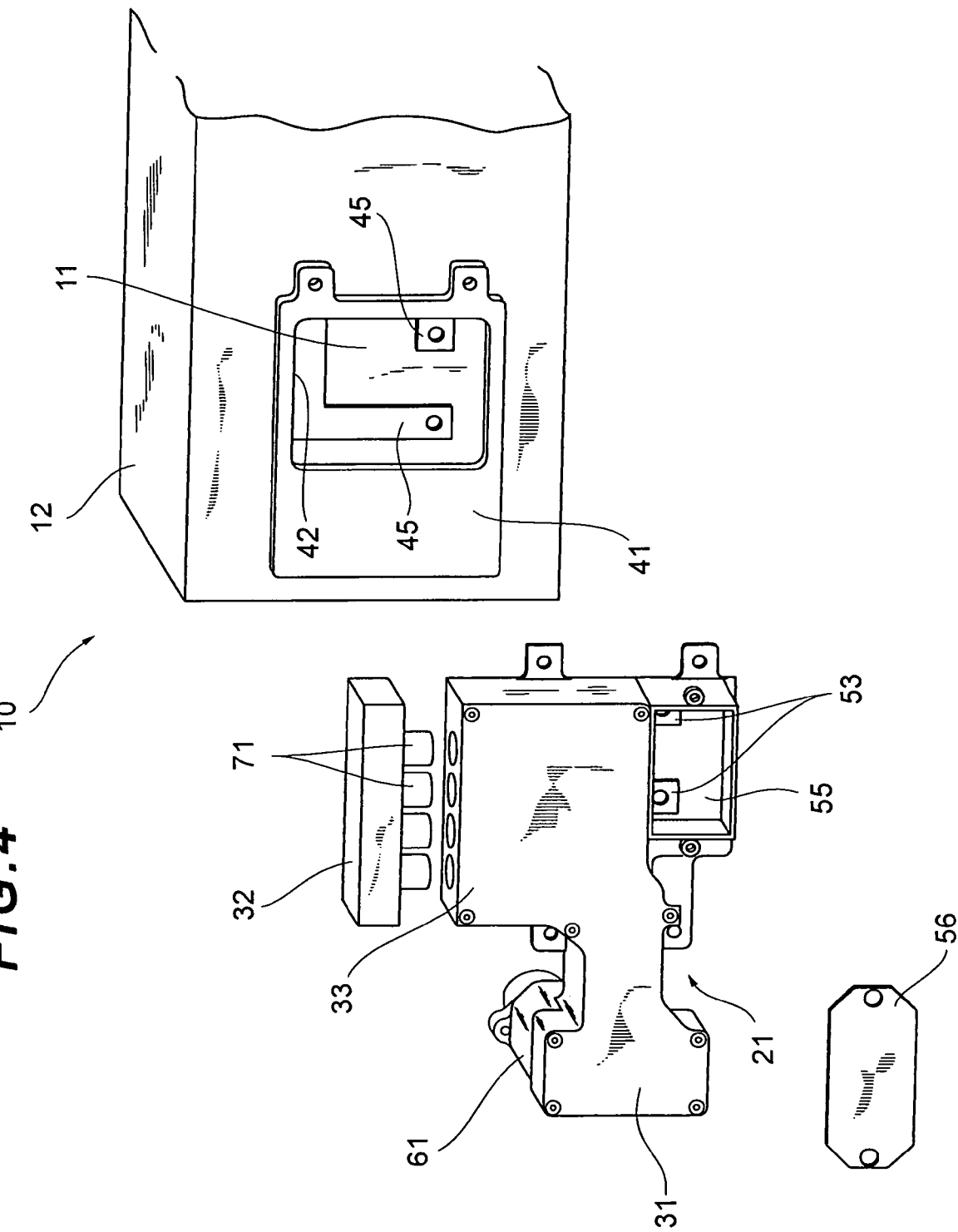
FIG. 4 is an exploded perspective view for illustrating a structure of the blocking device.

As shown in FIG. 4, the blocking device 21 is attached to an attaching portion 41 provided on one side portion of the stack case 12 using screws, and by attaching the blocking device 21 to this attaching portion 41, the first through hole 42 formed in the attaching portion 41 is covered with the blocking device 21 from outside.

Further, in the first through hole 42 of the stack case 12, an output bus bar 45 connected to the fuel cell stack 11 in the stack case 12 through a relay not shown is exposed.

Figure 5:
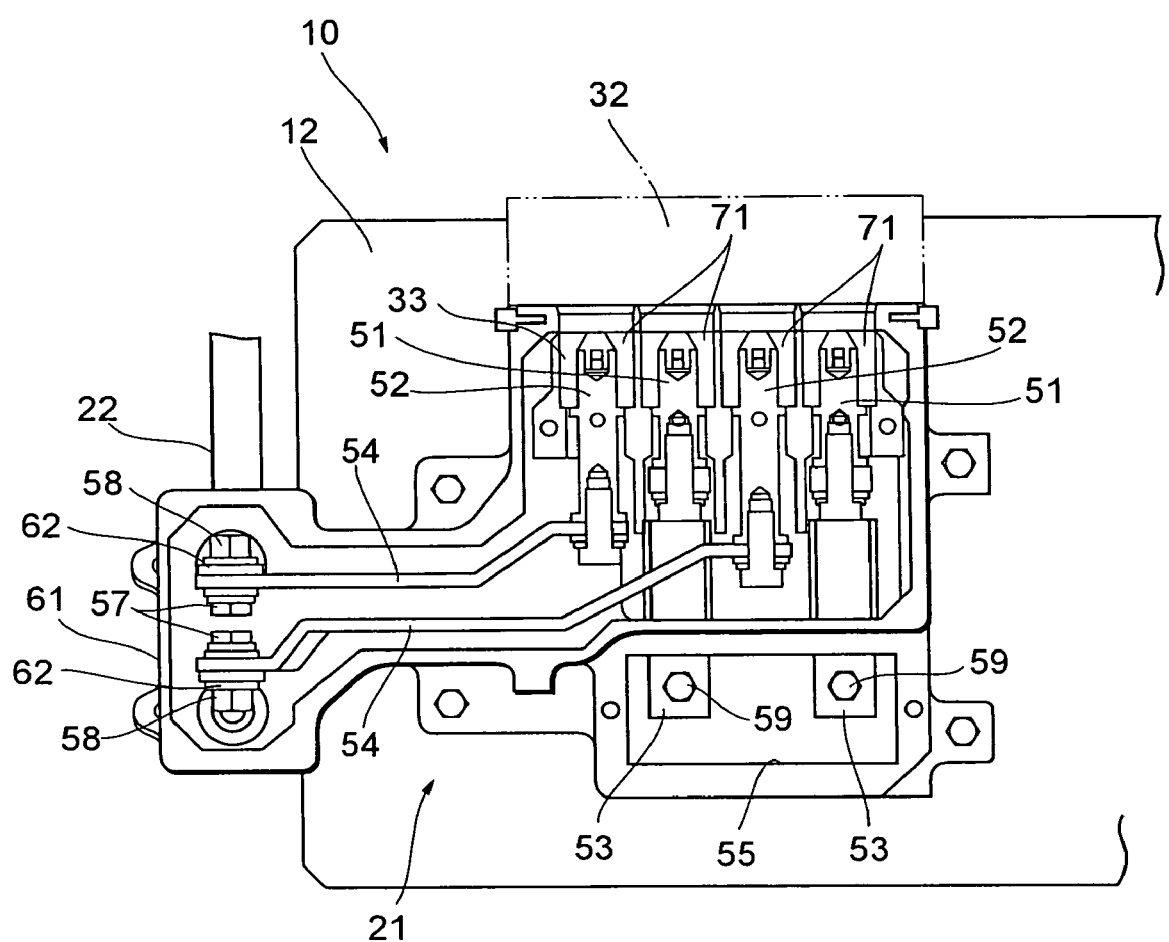
FIG. 5 is a longitudinal, cross-sectional view for illustrating an internal structure of the blocking device.

As shown in FIG. 5, in the blocking device 21, a pair of input terminals 51 and a pair of output terminals 52 are provided, and they are alternately disposed so as to protrude toward the plug connect portion 33. To each of the input terminals 51, a connecting bus bar 53 is connected, and to the output terminals 52, linking bus bars 54 are connected. The connecting bus bar 53 is bent inward and further extended downward.

In such manner, in this embodiment, one example of an output terminal portion of the fuel cell stack according to the present invention is configured with the input terminals 51 and the connecting bus bars 53.

In the blocking device 21, on its lower side, the second through hole 55 is formed, which constitutes a hole for maintenance and checkout (so-called "service hole") for allowing for access from the outside of the stack case 12 to the inside by communicating with the first through hole 42 formed in the attaching portion 41 of the stack case 12, and in this second through hole 55, an end portion of the connecting bus bar 53 is positioned seen in the flat plain.

To this second through hole 55, a closing cover 56 is configured to be attached from an outer surface side using screws, and by attaching this closing cover 56, the second through hole 55, then the hole for maintenance and checkout is closed.

Further, in the blocking device 21, in one side portion thereof, a cable connecting portion 61 is formed. In this cable connecting portion 61, a pair of terminals 62 is disposed, and to the terminals 62, the linking bus bars 54 are connected using a bolt 57 and a nut 58. To this cable connecting portion 61, the output cable 22 to be connected to the power control unit 23 is fixed, and a conducting wire of the output cable 22 is connected to a terminal 62.

The service plug 32 to be attached to the plug connect portion 33 of the blocking device 21 includes four connecting terminals 71, and by attaching this service plug 32 to the plug connect portion 33, the input terminal 51 and the output terminal 52 on the side of the blocking device 21 mate with the connecting terminals 71 of the service plug 32. Accordingly, the input terminal 51 and the output terminal 52 adjacent to each other are made in conduction through the service plug 32.

In such manner, in this embodiment, with these connecting terminals 71, one example of a junction portion for electrically connecting between the output cable and the output terminal portion in the blocking device according to the present invention is configured.

Further, the blocking device of the present invention includes: a first terminal (in this embodiment, the output terminal 52) electrically connected to a load (in this embodiment, the power control unit 23); a second terminal (in this embodiment, the input terminal 51) separated from this first terminal and electrically connected to the output terminal of the fuel cell stack 11 (in this embodiment, the connecting bus bar 53); and a conductor (in this embodiment, the connecting terminal 71) for making the first and second terminals in conduction. This conductor, in response to user's mechanical operation, moves between a position at which the first and second terminals are made in conduction and a position at which not in conduction.

Further, the blocking device according to the present invention and this embodiment includes a housing having a seating for supporting the first and second terminals and a cover for covering the second terminal etc. Then, the housing is disposed on a peripheral part of the first through hole (service hole) formed in the stack case 12, and plays a role of enforcing the peripheral part of the first through hole in the stack case 12.

In addition, for the blocking device of the present invention, in addition to the configuration in which the conductor can be separated from a blocking device body (in this embodiment, the plug connect portion 33 and the cable connecting portion 61), a configuration in which the conductor is integrally formed with the blocking device body so that it can move in between the first through hole and the second through hole, that is, a configuration like a so-called "breaker" may be also included.

By attaching the blocking device 21 configured in a way described above to one side portion of the stack case 12 so as to cover the first through hole 42, the end portion of the connecting bus bar 53 is laid on the output bus bar 45 connected to the fuel cell stack 11. Under such condition, the connecting bus bar 53 and the output bus bar 45 can be fastened together with a bolt 59 through the second through hole 55 to get into conduction.

Then, after the connecting bus bar 53 and the output bus bar 45 are fastened together through the second through hole 55, the closing cover 56 is put on so as to cover the second through hole 55 and this closing cover 56 is fixed with screws, thereby the first through hole 42 and the second through hole 55 constituting the hole for maintenance and checkout are covered with the closing cover 56, sealing the inside of the stack case 12.

In the fuel cell 10 including the blocking device 21 described above, electric power (output) generated by the fuel cell stack 11 is transferred from the output bus bar 45 to the power control unit 23 provided outside the stack case 12 through the connecting bus bar 53, the service plug 32, the linking bus bar 54 and the output cable 22.

When the fuel cell 10 is maintained, first, the service plug 32 of the blocking device 21 is removed from the plug connect portion 33. By doing so, the input terminal 51 and the output terminal 52 are pulled out from the connecting terminal 71, and the input terminal 51 and the output terminal 52 adjacent to each other are electrically disconnected from each other, securing safety against a high voltage of the fuel cell 10.

Under this condition, by removing the closing cover 56, it is enabled to maintain and check the fuel cell stack 11 or parts attached to it contained in the stack case 12 through the second through hole 55 and further the first through hole 42.

After completion of maintenance and checkout, by attaching the closing cover 56 to the edge of the opening of the second through hole 55 to ensure that the second through hole 55 and the first through hole 42 communicating with it are covered, the inside of the stack case 12 is sealed. After that, the service plug 32 is attached to the plug connect portion 33 of the blocking device 21, thereby the fuel cell stack 11 is brought into a state for allowing the output thereof to be supplied to an external device such as the power control unit 23.

As described above, owing to the fuel cell 10 according to the present invention, because of the configuration in which the second through hole 55 is formed in the housing made of a solid body, of the blocking device 21 and the second through hole 55 is covered with the closing cover 56, the flatness on the edge of the opening of the second through hole 55 can be enhanced. Accordingly, the closing cover 56 for closing the second through hole 55 can stably contact with the edge of the opening of the second through hole 55, securing sufficient sealing on the hole for maintenance and checkout composed of the second through hole 55 and the first through hole 42 communicating with it.

Further, an increased cost by having to accurately form the hole for maintenance and checkout by after-working on the stack case 12 formed by pressing can be kept down. That is, owing to this fuel cell 10, the hole for maintenance and checkout composed of the first through hole 42 and the second through hole 55 can be provided without the cost increase, and further the sufficient sealing on the hole for maintenance and checkout can be secured.

In addition, the service hole (in the embodiment described above, the first through hole 42 and the second through hole 55) can be also used as a through hole by an operator for maintenance and checkout, for example, when making the terminal of the service plug 32 (in the embodiment described above, the connecting terminal 71) and the output terminal of the fuel cell stack 11 (in the embodiment described above, the connecting bus bar 53) in conduction. The service hole 32 is provided so as to expose the output terminal of the fuel cell stack 11 when it is used for this purpose.

The term "output terminal of the fuel cell stack 11" used here may be a terminal connected to a terminal plate fastened together with the cell laminate, through a conducting wire, or a part of the terminal plate.

We claim:

1. A fuel cell, comprising:
   a fuel cell stack;
   a stack case for containing the fuel cell stack;
   a junction portion for electrically interconnecting an output cable for transferring an output of the fuel cell stack to a device provided outside the stack case, with an output terminal portion of the fuel cell stack; and
   a blocking device capable of interrupting interconnection of the junction portion through mechanical operation from outside the stack case, wherein
   in the stack case, a first through hole for allowing for maintenance and checkout from the outside of the stack case to the inside is formed, and to the stack case, the blocking device is attached so as to cover the first through hole from outside, and
   the blocking device comprises: a housing formed of a solid body; a second through hole for communicating the outside of the stack case with the inside by communicating with the first through hole; and a closing cover for closing the second through hole.

2. The fuel cell according to claim 1, wherein
   the housing of the blocking device is made of a solid body formed by machining aluminum in a form of a frame.

3. The fuel cell according to claim 1, wherein
   the blocking device further comprises a plug having a junction portion and a plug connect portion to which the plug is connected.

4. The fuel cell according to claim 3, wherein
   the plug connect portion comprises: a first terminal and a second terminal made in conduction due to mating with the junction portion, when the plug is attached; and a terminal to which the output cable is connected,
   an output terminal portion of the fuel cell stack is composed of the second terminal and a connecting bus bar connected to the second terminal, and
   the terminal to which the output cable is connected and the first terminal are connected to each other by a linking bus bar.

5. The fuel cell according to claim 3, wherein
   the blocking device further comprises: a first terminal electrically connected to a load; a second terminal separated from this first terminal and electrically connected to the output terminal of the fuel cell stack; and a conductor as a junction portion for making the first and second terminal in conduction, and
   the conductor moves between a position at which the first and second terminal are made in conduction and a position at which they are not made in conduction, in response to a user's mechanical operation.

6. The fuel cell according to claim 1, wherein
   the mechanical operation means removal of a plug from a plug connect portion.

* * * * *